United States Patent
Wissler et al.

(10) Patent No.: US 8,899,496 B2
(45) Date of Patent: Dec. 2, 2014

(54) HORIZONTALLY PIVOTABLE AGRICULTURAL SPRAYER WITH VERTICALLY PIVOTABLE SEGMENTS

(75) Inventors: Erhard Wissler, Bissingen/Teck (DE); Thomas Leschik, Friedrichshafen (DE)

(73) Assignee: CarboFibretec GmbH, Friedrichshafen (DE)

( * ) Notice: Subject to any disclaimer, the term of this patent is extended or adjusted under 35 U.S.C. 154(b) by 929 days.

(21) Appl. No.: 12/718,918

(22) Filed: Mar. 5, 2010

(65) Prior Publication Data

US 2011/0147487 A1 Jun. 23, 2011

(30) Foreign Application Priority Data

Dec. 18, 2009 (DE) .......................... 10 2009 059 111

(51) Int. Cl.
*B05B 1/20* (2006.01)
*A01M 7/00* (2006.01)

(52) U.S. Cl.
CPC ........... *A01M 7/0075* (2013.01); *A01M 7/0071* (2013.01)
USPC ............ 239/167; 239/166; 239/168; 239/163

(58) Field of Classification Search
CPC ... A01M 7/005; A01M 7/0053; A01M 7/075; A01M 7/0071
USPC .................................. 239/159–170
See application file for complete search history.

(56) References Cited

U.S. PATENT DOCUMENTS

| | | | | |
|---|---|---|---|---|
| 3,107,055 A | * | 10/1963 | Palmer ........................... | 239/164 |
| 4,394,968 A | * | 7/1983 | Tyler ............................. | 239/167 |
| 4,711,398 A | * | 12/1987 | Ganderton et al. ........... | 239/167 |
| 4,821,809 A | * | 4/1989 | Summach et al. ............ | 172/179 |
| 4,946,102 A | * | 8/1990 | DeWitt et al. ................. | 239/167 |
| 5,348,226 A | * | 9/1994 | Heiniger et al. .................. | 239/1 |

FOREIGN PATENT DOCUMENTS

| | | |
|---|---|---|
| DE | 1974964 | 12/1967 |
| DE | 2249666 | 4/1974 |
| DE | 8120081 | 1/1982 |
| DE | 3127103 | 1/1983 |
| DE | 8303206 | 11/1983 |
| EP | 0638227 | 2/1995 |

* cited by examiner

*Primary Examiner* — Dinh Q Nguyen
(74) *Attorney, Agent, or Firm* — Beyer Law Group LLP

(57) ABSTRACT

The invention concerns an agricultural sprayer with an arm comprising multiple segments, which are pivotable relative to each other, whereby the arm is pivotable out of a transport position into an operating position and/or back into a transport position, whereby the complete arm is attachable to a drawing vehicle, such as a tractor, and pivotable around a first horizontal swiveling axis, whereby at least one of the segments of the arm is pivotable around a second swiveling axis, which is in general vertically aligned in the transport position and whereby the discrete segments comprise units, which are arranged relative to each other per segment such, that a work plane through those units is in general vertically aligned in the transport position, wherein the complete arm is pivoted out of the transport position in the operating position around the first swiveling axis, such that the work plane is generally horizontally aligned. The invention concerns further a system with a tractor and such an agricultural sprayer, wherein a middle segment of the arm is positioned in the operating position on a support surface on the tractor. The invention concerns further a method for pivoting an arm comprising of a multitude of segments, whereby the arm is fully pivoted out of horizontally oriented operation position in a vertically oriented intermediate position and thereafter the discrete enlarging segments, sticking away from the middle segment (4), are pivoted in the direction of the middle section in a transport position.

13 Claims, 8 Drawing Sheets

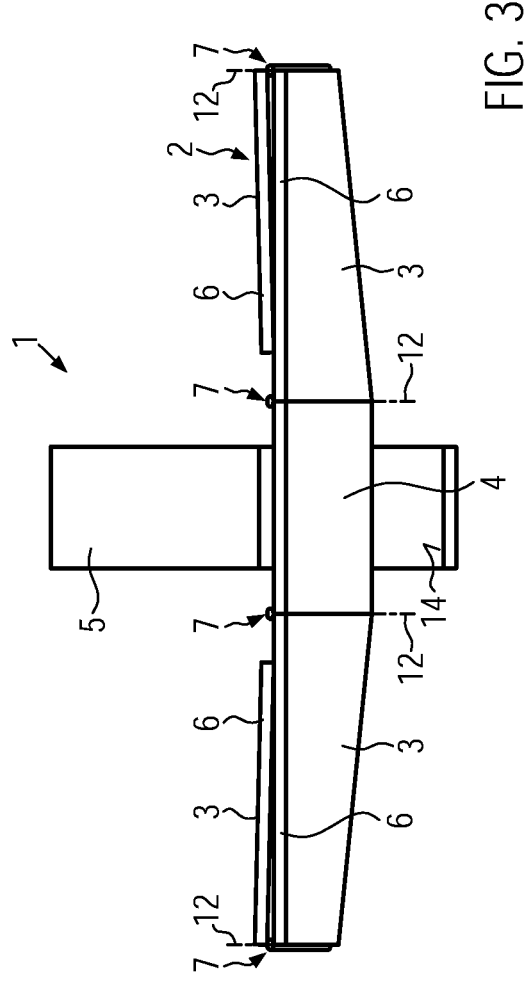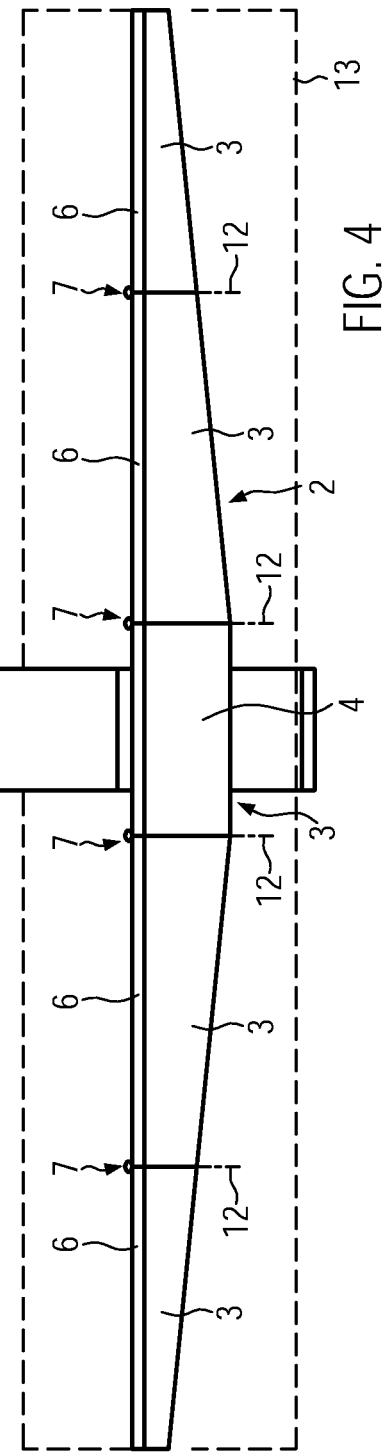

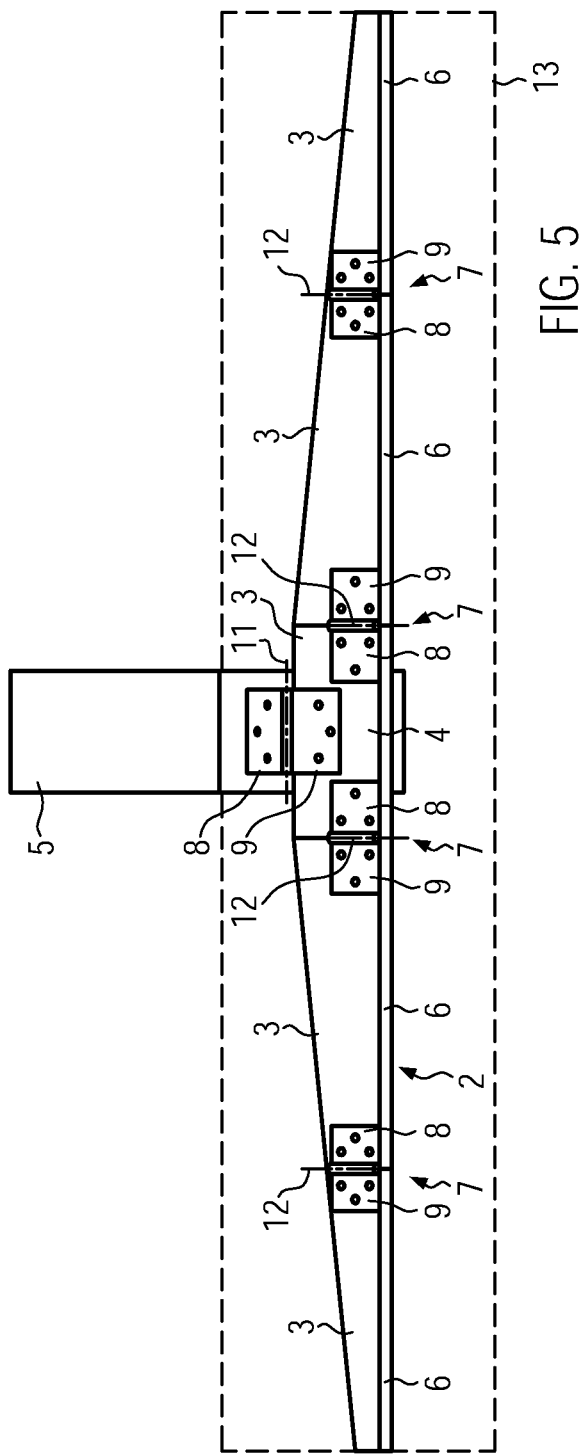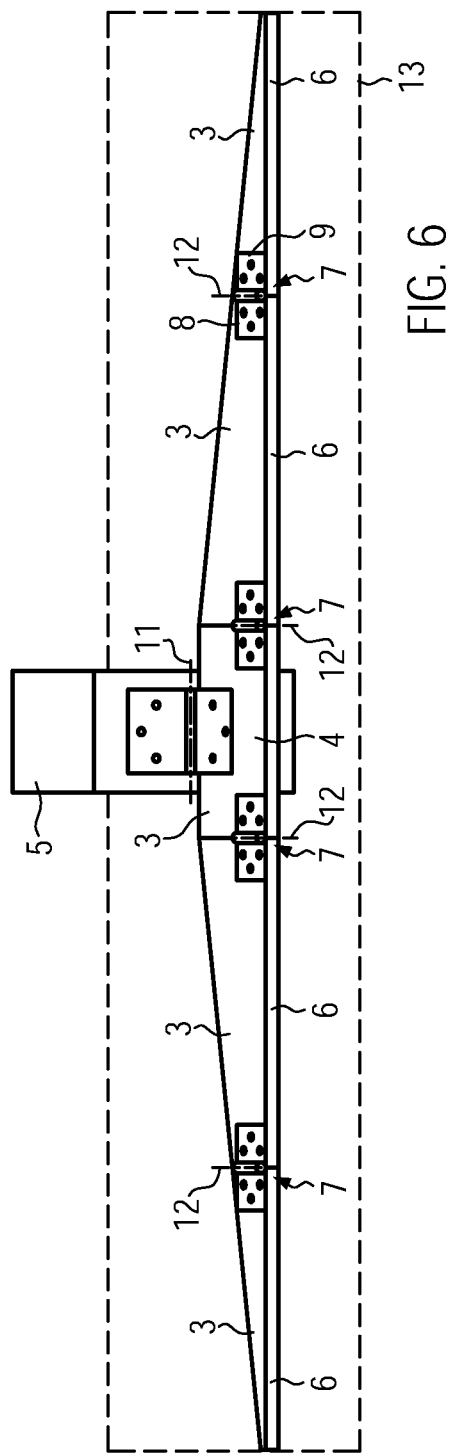

HORIZONTALLY PIVOTABLE AGRICULTURAL SPRAYER WITH VERTICALLY PIVOTABLE SEGMENTS

AREA OF THE INVENTION

Figure 1:
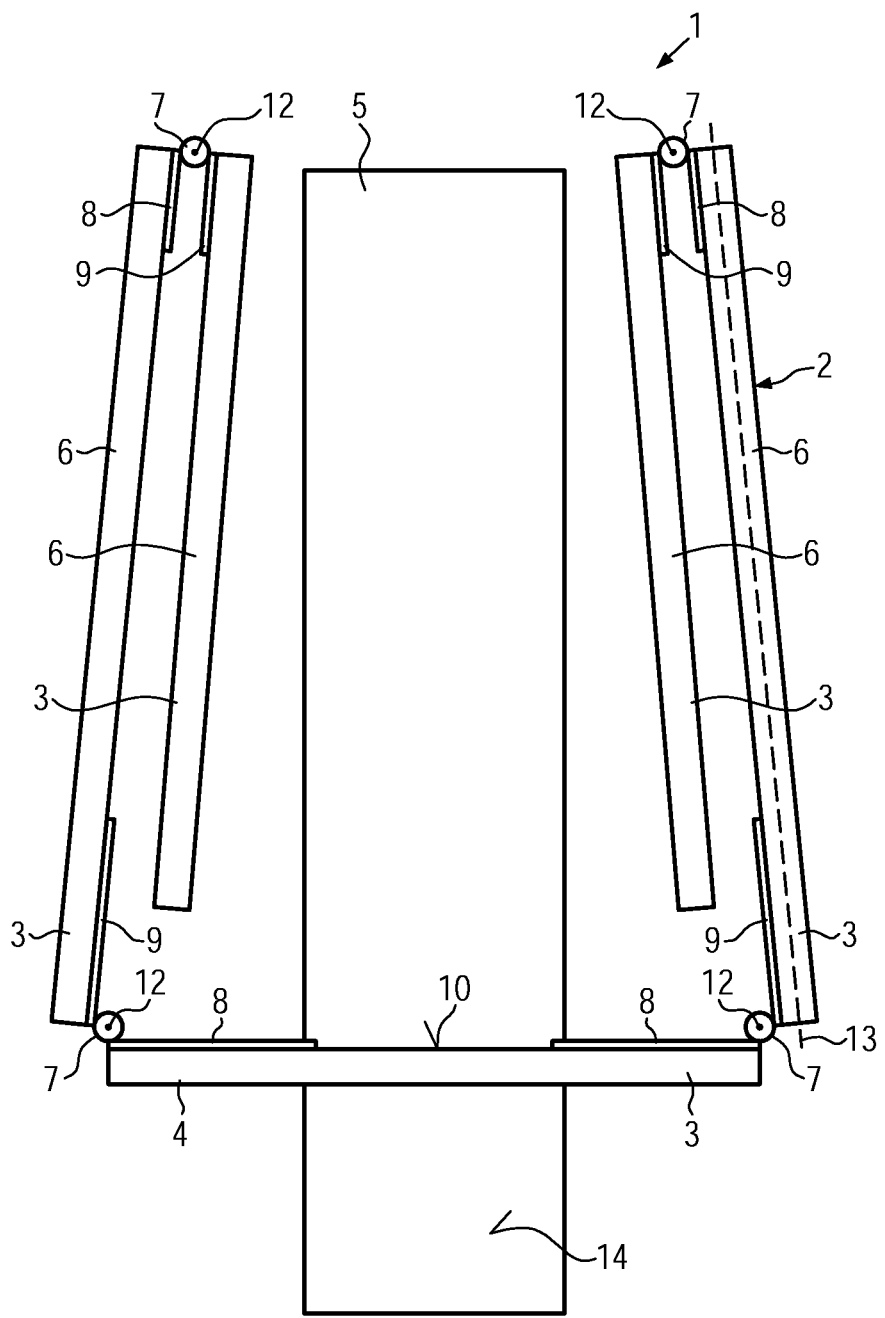

The invention concerns an agricultural sprayer with an arm comprising multiple segments, which are pivotable relative to each other, whereby the arm is pivotable out of a transport position into an operating position and/or back into a transport position, whereby the complete arm is attachable to a drawing vehicle, such as a tractor, and pivotable around a first horizontal swiveling axis, whereby at least one of the segments of the arm is pivotable around a second swiveling axis, which is in general vertically aligned in the transport position and whereby the discrete segments comprise units, which are arranged relative to each other per segment such, that a work plane through those units is in general vertically aligned in the transport position.

The invention concerns also a system with a tractor and an agricultural sprayer according to the principle of the invention.

The invention further concerns a method for pivoting an arm of an agricultural sprayer, which comprises multiple segments.

Agricultural sprayers are to deploy fertilizers, insecticides, pesticides, fungicides, herbicides, seeds or other gaseous, fluid or granular material in the technical field of agriculture are known in the prior art.

Under the definition of an agricultural sprayer are those sprayers comprised, which are able to drive by themselves, or are attached to a drawing vehicle, either directly or indirectly.

Agricultural sprayers are mostly used to deploy pesticides and/or fertilizers. It is common to attach the agricultural sprayer to a drawing vehicle such as to be positioned on or at the drawing vehicle, so that the agricultural sprayer can be moved to its site of operation. Such site of operation can be an agriculturally used field or a similar area.

To maximize the efficiency, it is known in the prior art that it is of advantage to maximize the area which can be covered/treated during one traverse. Consequently in the prior art the arms of the agricultural sprayer have such a big circumference, that, if they are moved out of a transport position, in which the agricultural sprayer has a relative narrow track width into an operating position, the agricultural sprayer than has an immense bigger width. During traversing a specified zone a bigger area can be treated/covered in one single working cycle.

Whereas the maximum width of the agricultural sprayer may not exceed the maximum width, which is allowed in road traffic, i.e. when the arm is positioned in the transport position, a maximized width in the operating position, i.e. for usage in the field, is desirable.

Pivotable systems are e.g. known of DE 9412577. In this document an agricultural sprayer with a leverage system seems to be disclosed. The leverage system comprises a number of hinges, with which the arms sticking out of the sides of the drawing vehicle can be swiveled within a horizontal plane. The hinges or joints are aligned vertically.

A slight height-adjustability is made possible by horizontally aligned pins, around which the leverage system can be swiveled when keeping its vertical alignment.

Cantilevers, comprising arms or enlarging segments, which are pivotable within a horizontal plane around vertically aligned joints, seem to be disclosed in DE 8303206 and DE 1974964.

Those known agricultural sprayers, which are pivotable within a horizontal plane comprise the drawback, that during the launch of the drawing vehicle an overfertilization and/or overtreatment of the field in this area results.

An explanation for this effect can be found in the fact that during the launch or start-up process of the drawing vehicle the expanded agricultural sprayer begins to swing, due to mass induced inertia. Consequently between 80 to 90% overfertilization, in case fertilizer is deployed, can be experienced, which is highly inefficient. Such inefficiency will also be always experienced, when the drawing vehicle breaks or accelerates.

Agricultural sprayers with elongateable segments, which are pivotable within a vertical plane, are also known of the prior art. Such systems are e.g. disclosed in DE 3127103 A1 and DE 8120081.

However, those systems comprise the additional drawback, that big actuating forces have to be used to pivot the elongateable segments, which leads to a construction using massive elements, which results in a cost intensive construction.

Further, document DE 2249666 discloses a pivotable agricultural sprayer with arms, which are either pivotable within a horizontal plane or a vertical plane.

It is the object of the current invention, that the drawbacks of the prior art are eliminated.

This object is solved such, that the complete arm is pivoted out of the trans-port position in the operating position around the first swiveling axis, such that the work plane is generally horizontally aligned.

Due to such a configuration only a small amount of force is necessary to move the whole arm out of the transport position into the operating position and back again. The elements used and needed for the pivoting or swiveling action, such as hydraulic cylinders, can contact directly or indirectly the drawing vehicle, without raising the weight of the agricultural sprayers decisively.

Further, it is possible that those actuators needed for pivoting the discrete segments of the agricultural sprayer are constructed less massive, as they will have to conduct only smaller amounts of force.

Such, it will be possible that the overall mass of the agricultural sprayer is minimized, which further minimizes the urge of the device to oscillate. On the one hand, the agricultural sprayer will get stiffer and, on the other hand, the overall system comprising of the drawing vehicle and the agricultural sprayer itself will also be optimized considering stiffness.

In sum, the intelligent mechanical configuration will obviate overfertilization of the soil.

Special advantageous embodiments are claimed in the dependent claims and described hereafter.

It is of advantage, if at least a multitude of units of the arm is configured of fiber-reinforced material. Such an agricultural sprayer does not necessarily comprise all features of claim 1. By constructing the arm to comprise a multitude of units of fiber-reinforced material, the stiffness of the agricultural sprayer is augmented and the mass is reduced. Such, a more precise distribution of the produce to be deployed, such as fertilizers, pesticides, insecticides, but also seeds, is made possible. This variant can be part of a divisional application.

If such units, which are used for sustaining the arm, are fabricated of fiber-reinforced material, it is achieved that those elements which are responsible for a mass augmentation in prior art agricultural sprayers can be minimized concerning their mass, without reducing the stiffness or stability of the overall construction. It has been recognized to be of immediate advantage to use carbon fibers, aramid fibers or glass fibers and/or any combination of those fibers in the fiber-reinforced material.

It was also experienced to be of advantage, if on both sides of a middle segment two or three enlarging segments sticking out and being pivotable towards the middle segment, are aligned in a row by joints, which are positioned in between both enlarging segments. The enlarging segments, which are aligned along one straight line, are connected by the middle segment and by respective joints with each other. The width of the agricultural sprayer is enlargeable such that during the traverse of a soil portion, the directly or indirectly driven agricultural sprayer can cover an especially big area.

It is especially advantageously to combine two or three enlarging segments on both sides of the middle segment, as in this condition the track width allowed by road traffic licensing regulations can be met and in spite of this, an especially big area can be covered/treated.

An especially convenient construction can be realized, when those enlarging segments on one side of the middle segment can be swiveled towards the middle segment in one and the same swiveling direction and/or the other enlarging segments, which are positioned on the other side of the middle segment, are pivotable in a second swiveling direction, which is contrary to the first swiveling direction. Such, the actuators necessary to pivot the enlarging segments, can be positioned on one and the same side of the arm. The ease of installation is consequently increased.

It is further of advantage, if the joints are positioned and/or configured such, that only a maximum pivoting movement of the enlarging segments into one single plane, in which the middle segment is comprised, is allowed. The positioning of the joints, joining the enlarging segments and/or the middle segment with each other, leads to a simple locking mechanism to fix the unfolded arm in its operating position. Only the physical weight of the enlarging segments is necessary in this regard, so that those enlarging segments touching each other or the middle segment in the operating position are aligned such that an angle of about 180° between the enlarging segments and/or the enlarging segments and the middle segment exists.

If the enlarging segments in the transport position are positioned in two theoretical planes, which are arranged parallel to each other and arranged orthogonal to the working plane through the middle segment, the enlarging segments can be pivoted/swiveled towards the drawing vehicle so that a simple and allowable transportation over public streets from the site of operation, namely the field, to a distanced site of operation or a storage area, such as a farm, is made easier.

An especially advantageously configured embodiment is characterized in that the segments are configured laminarily and/or the respective outsides are configured as laminary dishes, which hermetically close the area in between them. It will be possible to minimize the fuel consumption by an aerodynamically shaping of the segments, when the agricultural sprayer is transported to the site of operation or from the site of operation. The agricultural sprayer is in addition not as susceptible to winds during the ejection of the property, compared to conventional agricultural sprayers.

A system with a tractor and an agricultural sprayer according to the invention solves the previous problem also especially well, if the middle segment of the arm is positioned in the operating position on a support surface on the tractor. Such, an actuator used to move the arm is in addition not strained anymore when the arm has been brought in its operating position. It is also possible that the actuator is unloaded, as soon as the arm has reached this operating position.

Hydraulical or pneumatical cylinders can be used as actuators.

The initial problem can also be solved by a method to pivot an arm comprising of a multitude of segments such, that the arm is swiveled in full, i.e. unfolded, out of a horizontally aligned operating position in a vertical interim position. The single enlarging segments, sticking away from the middle segment, are swiveled in direction of the middle segment to reach the transport position. Such, a swift movement of the single segments without the application of high forces it made possible.

Especially advantageously configured embodiments are also characterized in that the area between the dishes, at least first conduits for the ejection, feeding and distribution of the property to be deployed, such as fertilizer, seeds, insecticides or pesticides, are arranged therein. The fabrication of such dishes can be cost efficiently conducted with traditional means. If fiber-reinforced material is used, especially light variants of the dishes can be achieved.

An additional advantage can be realized, if from both sides and adjacent to the first conduit, second conduits exist, to lead air to nozzles, which are them-selves positioned in the direct vicinity of apertures in the first conduit or if the air in the interior of a segment in between the dishes, can be pressurized. Such, a hermetical encapsulation of the interior of the segment can be realized, so that impact of aggressive media, which is expelled through the first conduit, on the discrete elements of the agricultural sprayer is obviated. Even the outside of the first conduit itself is protected against corrosion caused by the expelled good, to the same amount as the interior area of the segment as such. This aspect can also be realized without the single and distinctive features of claim 1 and can be the object of a divisional application. The additional features of the other claims are not essential for such a variant of an agricultural sprayer.

Another embodiment is characterized in including inflatable airbags which are used to realize the folding operation as well as the unfolding operation of the enlarging segments, so that those airbags are in contact with at least two enlarging segments or one enlarging segment and the middle segment, and are positioned on top of the dish, if the arm is in its operating position. Further, a spring, such as an expander, positioned on the same side of the arm to fold the enlarging segments back in the transport position, may be present. Such, even though mass reduced elements are used, the facile movability of the enlarging segments is realized.

By using a spring, such as an expander, a very robust and easy to maintain arrangement of actuating elements can be realized.

A special advantage can be realized, if the spring is positioned within the air-bag and/or both motion effecting means abut the respective joint, which is also fixed to the upper dish on top of the arm. The longevity of the single components is augmented thereby.

There is an advantage, if a bellows seals the area of the joint on both sides of the arm to the outside. An intrusion of dirt particles in between the enlarging segments and/or in between the enlarging segments and the middle segment will be avoided therewith. It will therefore be made sure that the pivoting movement is kept unhindered during the whole life cycle.

Further it is possible that a multitude of first conduits is positioned equidistantly to each other and in parallel or oblique to one another on the lower dish during the operating position of the arm, whereby a fluid communication with the exterior area is made possible by apertures in the first conduits. The apertures in the first conduits cooperate with the apertures in the lower dish to facilitate the ejection of pressured air, which augments the precision during the ejection of the property, so that the property pierces the soil to a greater ex-tend.

The invention will also be explained by help of a drawing.

Figure 2:
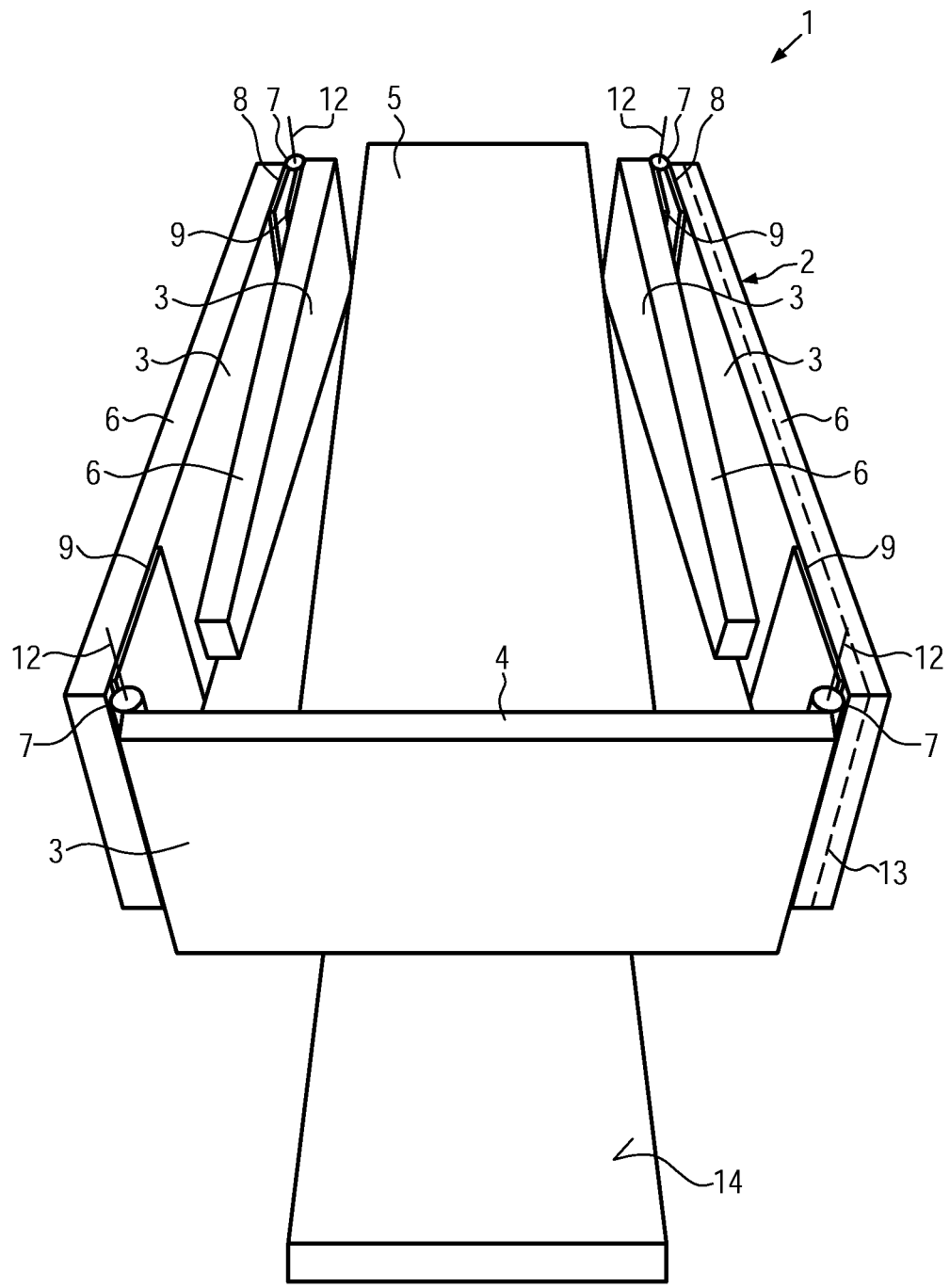
Figure 7:
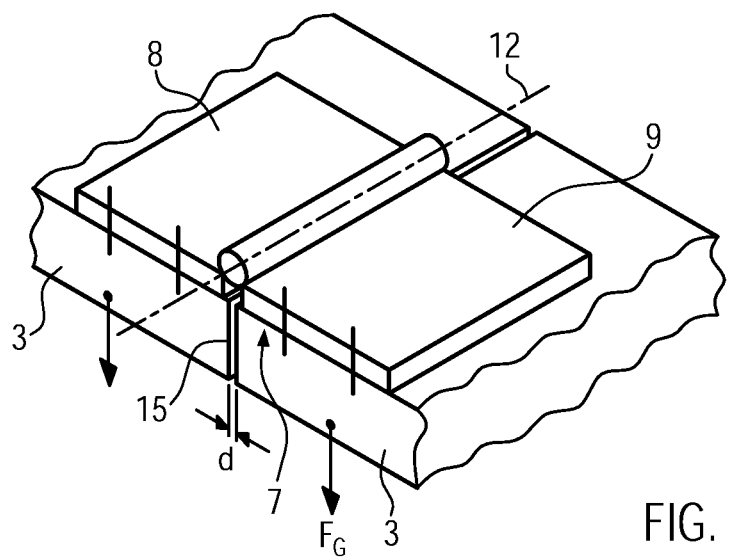
Figure 8:
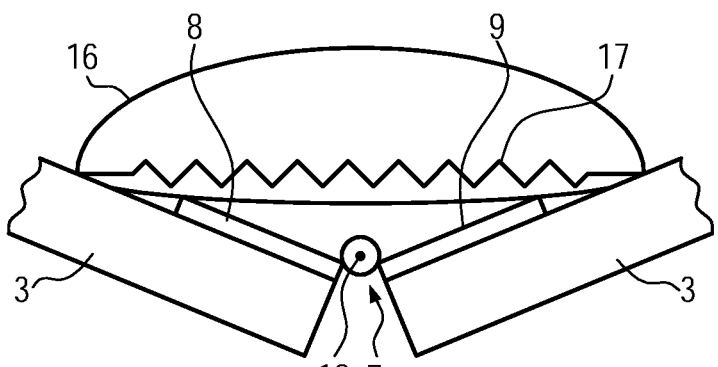
Figure 9:
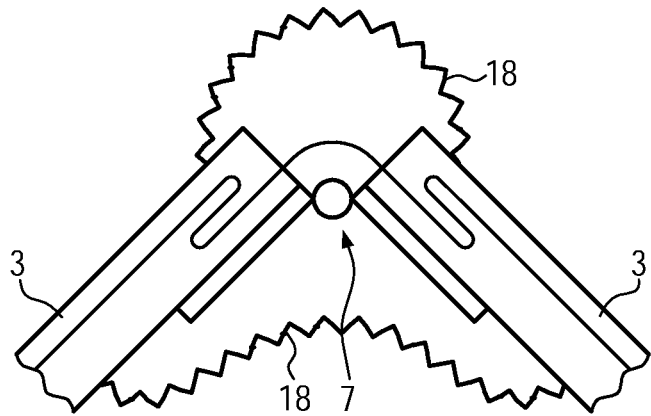
Figure 10:
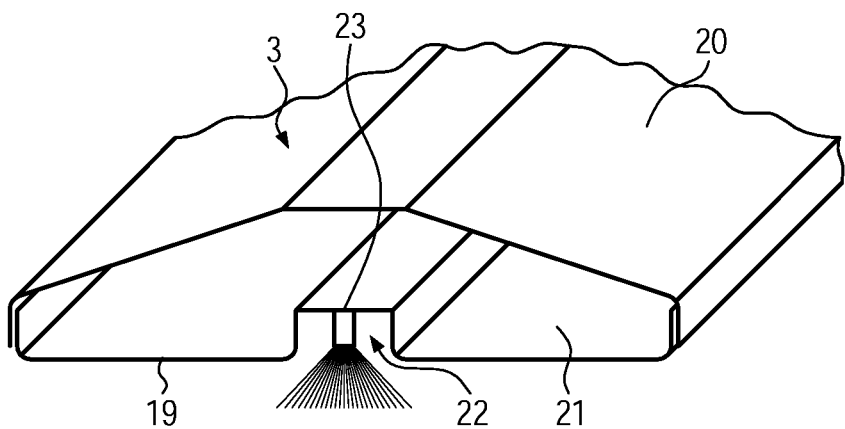
Figure 11:
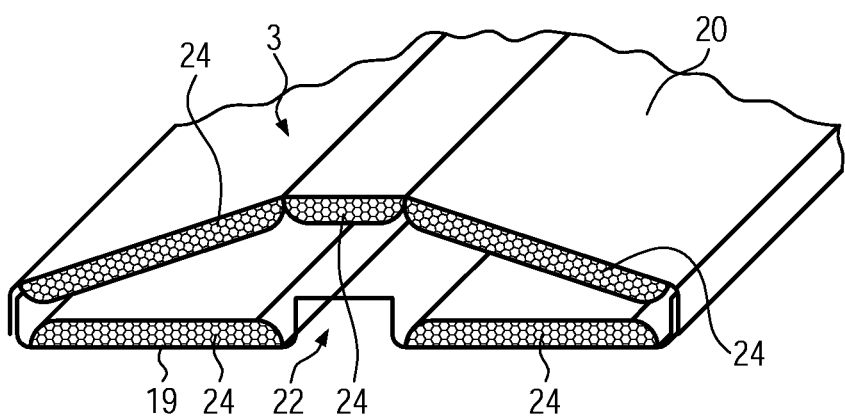
Figure 12:
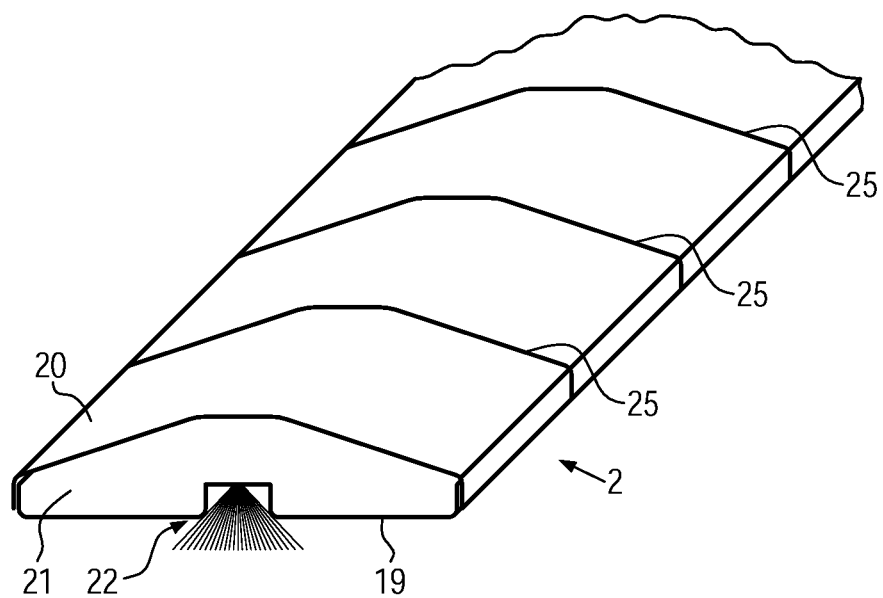
Figure 13:
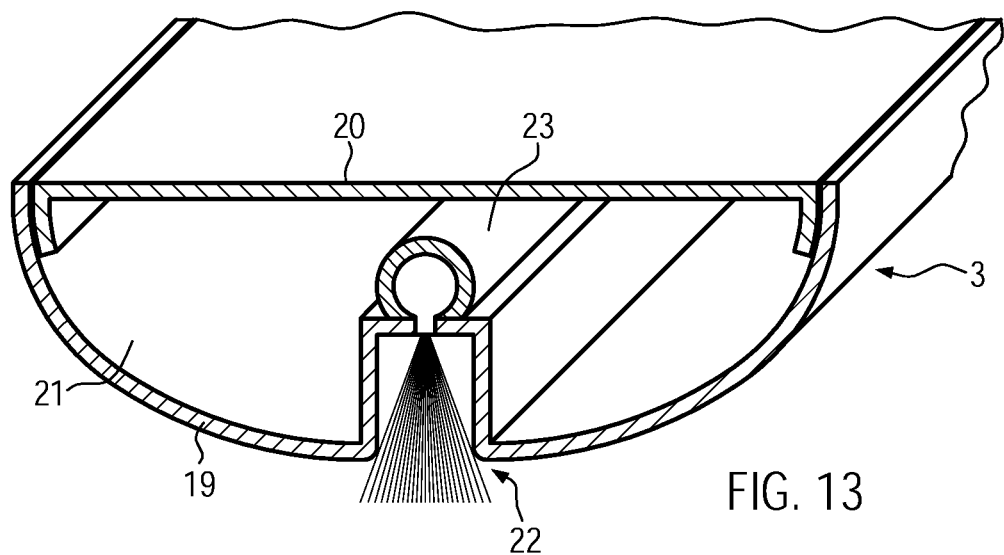
Figure 14:
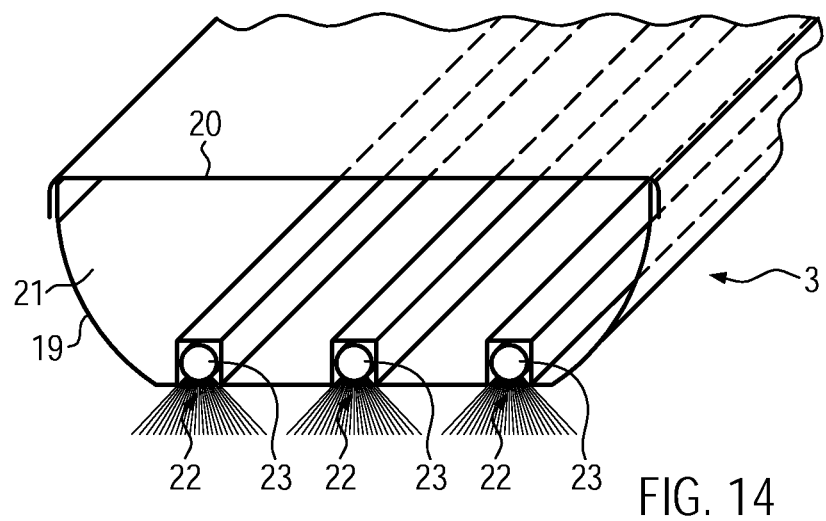
Figure 15:
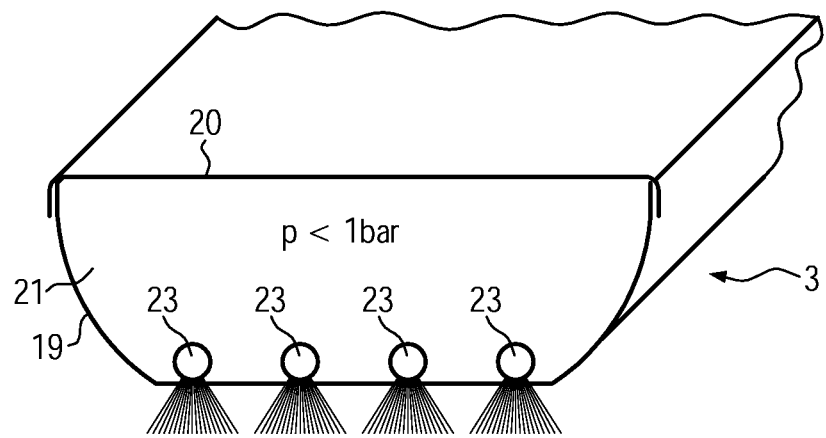

The Figures therein disclose the following:

FIG. 1 a schematic view of the principle of the agricultural sprayer according to the invention, with a middle segment and two enlarging segments on each side of the middle segment, whereby the two enlarging segments are positioned next to each other in a transport position, FIG. 2 a perspective view of the principle of the invention in the transport position, FIG. 3 a perspective view of a transition or intermediate position, in which the two enlarging segments, next to the middle segment and in direct contact with it, are moved in a pivoted position, during the transition from the transport position in the operating position, FIG. 4 the two completely unfolded enlarging segments in a next method step, during which the enlarging segments are aligned with the middle segment, shortly before reaching the operating position, FIG. 5 the completely unfolded enlarging segments abutting the middle segment and which are swiveled in a subsequent step, FIG. 6 a further perspective view of the arm which has reached its operating position, FIG. 7 a detail of a hinge with a joint, connecting a middle segment with an enlarging segment or two enlarging segments with each other, FIG. 8 a detail of the arm in the area of a joint with airbags between two segments and a therein positioned expander, FIG. 9 the area of a joint, with a bellows surrounding a joint area, FIG. 10 a special two-dish-configuration of a segment of the arm, FIG. 11 a variant of the arm with another two-dish-segment, FIG. 12 another variant of a two-dish-arm with reinforcing ribs, FIG. 13 another cross-sectional display of another embodiment, according to the invention, FIG. 14 a variant of a two-dish-segment with a multitude of first conduits which are arranged parallel to each other and FIG. 15 another variant of a two-dish-segment with a multitude of first conduits, whereby the interior area between the single dishes is pressurized.

The figures are only of schematic nature and shall simply facilitate the under-standing of the invention. For the same elements the same reference numbers are used.

In FIG. 1 an agricultural sprayer 1 is disclosed. The agricultural sprayer 1 comprises an arm 2. The arm 2 comprises a multitude of segments 3. A middle segment 4 is attached to a drawing vehicle 5. The drawing vehicle 5 is a tractor, an earth-moving machine or another comparable agricultural vehicle. The connection between the middle segment 4 and the drawing vehicle 5 can be such, that the agricultural sprayer 4 is detachable; can be hang up or of permanent nature. Arranged orthogonally in relation to the longitudinal direction of the drawing vehicle 5 and standing off from the middle segment 4, a multitude of enlarging segments 6 are hingedly connected to the middle segment 4, and/or with each other.

In FIG. 1 the arm 2 is displayed in its transport position.

Between the middle segment 4 and the respective abutted enlarging segment 6, a joint 7 is positioned. The joint 7 contacts the middle segment 4 with a first hinge portion 8 and contacts the respective enlarging segment 6 with a second hinge portion 9. Between two enlarging segments 6 there is also a joint 7 positioned, whereby the first hinge portion 8 is in contact with a first enlarging segment 6 and the second hinge portion 9 is in contact with a second enlarging segment 6.

As disclosed in FIG. 1, the first and second hinge portions 8 and 9 are positioned on the side of the arm 2, which is next to the drawing vehicle 5, when the agricultural sprayer 1 is in its transport position.

The single segments 3 are of a laminary configuration. However, it is also possible that a frame construction of tubes is used to form the segments 3. The tubes can be of round, elliptical or square cross section. Further, all polygonal cross sections can be used.

In one embodiment, which can be the subject of a divisional application, even without the features of claim 1, the supporting elements are configured of fiber-reinforced material.

In a special embodiment the segments 3 are created of laminarily configured fiber-reinforced material.

It is of advantage, if the segments 3 or at least the supporting elements are configured in its entirety of fiber-reinforced material. As fiber-reinforced material such materials comprising carbon fibers, aramid fibers or glass fibers can be used. Also any combination of those fibers can be employed.

In FIG. 5 the connection between the middle segment 4 of the arm 2 to the drawing vehicle 5 by means of another joint is well determinable. In this case a first hinge portion 8 is connected to the drawing vehicle 5 and a second hinge portion 9 of the joint is connected to the middle segment 4 at an upper surface 10 of the middle segment 4, which is displayed in its operating position. This joint, making the connection between the drawing vehicle 5 and the arm 2 possible, comprises a first horizontally aligned swiveling axis 11.

This first horizontal swiveling axis 11 can be very well seen in FIG. 5.

However, second swiveling axes 12 are already well determinable in FIG. 1. When the agricultural sprayer 1 is in the transport position, those second swiveling axes 12 are vertically aligned.

The first swiveling axis 11 rests horizontally aligned in the transport position, whereas after a pivoting or swiveling movement around the first swiveling axis 11, the second swiveling axes 12 are also aligned horizontally.

If the arm 2 is moved from the transport position, as shown in FIG. 1, in the operating position, as shown in FIGS. 5 and 6, first of all those enlarging segments 6, which are attached to the middle segment 4 are moved around the still vertically aligned second swiveling axes 12, as shown in FIG. 3.

The transition can be appreciated after studying FIG. 2. In this perspective visualization, it is determinable, that those enlarging segments 6, which are positioned next to the drawing vehicle 5 in the transport position of the agricultural sprayer 1, have distal ends which are smaller and more acute, compared to the other ends.

As successive step, those enlarging segments 6, which are furthest away from the middle segment 4, are pivoted in the same plane as the other enlarging segments 6, whereas the plane also comprises the middle segment 4. In FIG. 4 there is consequently a transition position visualized, which resembles the position, through which the arm 2 passes, when moved from the transport position to the operating position or vice versa. To simplify the understanding of the drawings, the working plane through the single segments of the units is only visualized in FIGS. 2 and 5 and is referred to with the reference number 13.

The completely unfolded arm 2, as visualized in FIG. 4, will then be moved out of the transition position and into the operating position, which is displayed in FIG. 5, during a pivoting movement around the first swiveling axis 11. The enlarging segments 6 and the middle segment 4 are in the same working plane 13 arranged, which is thereafter horizontally aligned. The working plane 13 therefore changes its position in space during the pivoting movement. Thus, working plane 13 is theoretically/figuratively attached to the enlarging segment 6. The working plane 13 is vertically oriented in the transport position and horizontally oriented in the operating position.

A relatively soil parallel configuration of the completely unfolded arm 2 in its operating position, is visualized in FIG. 6. The partially laminary resting of the middle segment 4 on a ledge 14 of the drawing vehicle 5 is also determinable. As soon as the operating position is reached, a non-displayed hydraulical or pneumatical actuator can be brought in a relaxed position again, which has a positive effect on the life-cycle of the actuator.

In FIG. 7 the attachment of the joint 7 to two laminarily configured segments 3 of the arm 2 is disclosed. With the arrow FG the physical weight forces are abstracted. A gap 15 between the two segments 3 is oversizedly displayed, so that the two other surfaces of segments 3 are spaced apart by a distance d. The distance d is of a magnitude of 0.5 cm to 0.1 cm, whereby also smaller distances such as 0.5 mm can be realized.

In FIG. 8 an actuator in its operating position, above the joint 7 is displayed. This actuator is a combination of an airbag 16 and a spring 17. The spring 17 can be configured as an expander. The spring 17 is positioned within the air-bag 16. In the current embodiment the exterior of the airbags 16 is attached to two segments 3 of the arm 2 and the expander is arranged within the air-bag 16, such as to convey force to those two segments 3.

The dirt repellant surrounding of a joint 7 by a bellows 18 is displayed in FIG. 9. In addition, the guidance of an electrical and/or pneumatical conduit in the two segments 3 is displayed in a schematical way, whereby the electrical and/or pneumatical conduit comprises means to make a length adjustment possible, to allow a pivoting movement of the two segments 3 relative to each other.

A second embodiment is disclosed in FIG. 10, whereby a two-dish-configuration is chosen such that a first dish 19 is in its transport position below a second dish 20. The first dish 19 is connected with the second dish 20, whereby the respective segments of the first dish 19 and the second dish 20 overlap with each other. In the current embodiment the second dish 20 encompasses a part of the first dish 19. The two dishes 19 and 20 define an interior area 21. This interior area 21 is basically of hollow nature.

The two joints 7 are not displayed in this embodiment. However, segment 3 is usable as enlarging segment 6 or as middle segment 4. Consequently at least one joint 7 or preferably two joints 7, depending on the position they shall be used in, are present.

On the exterior of the first dish 19 a groove 22 is present. This groove 22 can be configured as a channel, a spline, a flute, a crease or a scratch. In the groove 22 a first conduit 23 for ejection of a dispensable property is arranged. The first conduit 23, which is realized in FIG. 19, has a square cross-section.

Another variant is disclosed in FIG. 11, the first dish 19 and the second dish 20 are reinforced by foam sections 24 on their interior. Further, no joints 7 are displayed, though of advantage. The first conduit 23 is also not disclosed; however the first conduit 23 is present.

Another perspective view of the arm 2 according to the embodiments of FIGS. 10 and 11 is also disclosed in FIG. 12, whereby additional reinforcing ribs 25 are indicated therein. Those ribs 25 are arranged within both dishes and in contact with those two, to reinforce both of them. Even though the joints 7 are not displayed, they are present, as they are also present in the embodiment of FIGS. 13 to 15.

As in FIGS. 10 to 12 embodiments are displayed, which have on their upper side a concavity, the necessary space to fold the arm 2 into its transport position is minimized by the embodiment of FIG. 13, due to the upper surface being flat.

It is also possible that the respective segments are alternately concave on the upper surface and straight on the lower surface, i.e. flat, or vice versa. There is an advantage, if the plane or flat configured surfaces are always swiveled on one another, if the transport position is obtained.

Though in FIG. 10 the first conduit 23 is positioned on the outside of the first dish 19, the first conduit 23 in the embodiment according to FIG. 13 is arranged within the dishes 19 and 23. A combination of those two embodiments with each other is possible.

To avoid a dispensing of the deployable property in the form of a mist, and contrary to this, to achieve an exact and curtain-like deployment, so that the deployable property can insert deeply into the soil, it is preferable, if on both sides of the first conduit 23 non-displayed second conduits are arranged parallel to the first conduit 23, within the interior area 21 or exterior to the interior area 21.

The first conduit 23 and the second conduits both comprise apertures, which can be configured as nozzles, to expel the property in the conduit. However, the second conduits only comprise pressurized air within them.

In FIG. 14 another embodiment is displayed, however, in this embodiment a plurality of conduit 23 is present, whereas the first conduits 23 are arranged next to each other.

Although there is a lot of variants possible, so that those conduits, which are continuously arranged next to one middle first conduit 23 direct air, such that the ejection of air out of the second conduits has a guiding effect on the property dispelled of the first conduit 23.

If the first dish 19 is attached to the second dish 20 in a suitable way, such that the interior 21 is hermetically sealed, the secondary conduit need not be present, as pressurized air can be led via the interior 21 itself. The apertures in the dish 19 are not displayed in FIG. 19, however they are present and are positioned next to the four first conduits 23.

The invention claimed is:
1. An agricultural sprayer comprising:
 a sprayer arm having a multiplicity of discrete segments, each segment being pivotal relative to an adjacent segment, wherein the sprayer arm is pivotally moveable between a transport position and an operating position, the complete sprayer arm being attachable to a drawing vehicle; and
 a multiplicity of sprayer nozzles carried on the sprayer arm and configured to spray fluid materials; and
 wherein a plurality of the segments are pivotal around a first horizontal swiveling axis, and at least one of the plurality of segments is pivotal around a second swiveling axis, wherein the swiveling axes are generally vertically aligned in the transport position and are general horizontally aligned in the operating position such that the plurality of segments are generally vertically ori- ented in the transport position and all of the segments are generally horizontally aligned in the operating position.

2. An agricultural sprayer according to claim 1, wherein at least a multitude of the arm segments are configured of fiber-reinforced material.

3. An agricultural sprayer according to claim 2, wherein arm segments, which are used for sustaining the arm, are fabricated of fiber-reinforced material.

4. Agricultural sprayer according to claim 1, wherein on both sides of a middle segment two or three enlarging segments are sticking out and are pivotable towards the middle segment, as well as they are aligned in a row by joints, which are positioned in between both enlarging segments.

5. Agricultural sprayer according to claim 4, wherein those enlarging segments on one side of the middle segment can be swiveled towards the middle segment in one and the same swiveling direction and/or the other enlarging segments, which are positioned on the other side of the middle segment, are pivotable in a second swiveling direction, which is contrary to the first swiveling direction.

6. Agricultural sprayer according to claim 5, wherein the joints are positioned and/or configured such, that they allow only a maximal pivoting movement of the enlarging segment into one single plane, in which the middle segment is comprised.

7. Agricultural sprayer according to claim 6, wherein the enlarging segments in the transport position are positioned in two theoretical planes, which are arranged parallel to each other and arranged orthogonal to the working plane through the middle segment.

8. Agricultural sprayer according to claim 1, wherein the segments are configured laminarily and/or the respective outsides are configured as laminary dishes, which hermetically close the area in between them.

9. System with a tractor and the agricultural sprayer according to claim 1, wherein a middle segment of the arm rests in the operating position on a support surface on the tractor.

10. An agricultural sprayer comprising a sprayer arm having a multiplicity of discrete segments and a multiplicity of sprayer nozzles carried by the sprayer arm and configured to spray fluid materials, the complete sprayer arm being attachable to a drawing vehicle, the sprayer arm segments including:
   a base segment having first and second ends;
   a first extension segment, a first end of the first segment being pivotally attached to a first end of the base segment;
   a second extension segment, a first end of the second segment being pivotally attached to a second end of the first segment;
   a third extension segment, a first end of the third segment being pivotally attached to a second end of the base segment; and
   a fourth extension segment, a first end of the fourth segment being pivotally attached to a second end of the third segment; and
   wherein the extension segments are pivotally moveable between a transport position and an operating position, wherein in the operational position, the segments all extend in a generally horizontal line, and in the transport position, the first and third segments extend upward from the base segment, the second segment extends downward from its pivotal attachment to the first segment, and the fourth segment extends downward from its pivotal attachment to the third segment.

11. An agricultural sprayer as recited in claim 10 wherein the extension segments are formed from a fiber-reinforced material.

12. An agricultural sprayer as recited in claim 10 wherein at least the second and fourth extension segments are formed from a fiber-reinforced material.

13. An agricultural sprayer comprising a sprayer arm having a multiplicity of discrete segments and a multiplicity of sprayer nozzles carried by the sprayer arm and configured to spray fluid materials, the complete sprayer arm being attachable to a drawing vehicle, the sprayer arm segments including:
   a base segment having first and second ends and a center midpoint;
   a first extension segment and a first hinge that pivotally couples the a first end of the first extension segment to the base segment; and
   a second extension segment and a second hinge that pivotally couples the extension segment to a second end of the first extension segment, and
   wherein in the transport position, the first extension segment is pivoted relative to the base to extend upward from the base segment and the second extension segment is pivoted relative to the first extension segment to extend downward towards the base segment at a location laterally closer to the base center midpoint than the first extension segment.

* * * * *